United States Patent

[11] 3,586,956

| [72] | Inventors | Michael Murray Bertioli<br>Lichfield;<br>Malcolm Williams, Solihull, both of, England |
|---|---|---|
| [21] | Appl. No. | 805,538 |
| [22] | Filed | Mar. 10, 1969 |
| [45] | Patented | June 22, 1971 |
| [73] | Assignee | Joseph Lucas Industries Limited<br>Birmingham, England |
| [32] | Priority | Mar. 11, 1968 |
| [33] | | Great Britain |
| [31] | | 11688/68 |

[54] BATTERY-CHARGING SYSTEMS FOR ROAD VEHICLES
1 Claim, 3 Drawing Figs.

[52] U.S. Cl......................................................... 320/40,
317/16, 317/31, 317/33, 320/40, 320/59, 320/71,
321/18, 322/91
[51] Int. Cl......................................................... H02p 9/00

[50] Field of Search........................................... 320/40, 61,
64, 39, 1—70; 322/73, 28

[56] References Cited
UNITED STATES PATENTS

| 3,341,763 | 9/1967 | Noddin | 322/9 X |
| 3,427,529 | 2/1969 | Cummins et al. | 322/28 X |
| 3,524,123 | 8/1970 | Williams et al. | 320/40 X |
| 3,364,411 | 1/1968 | Wright | 322/28 |
| 3,365,645 | 1/1968 | Jacobs | 320/39 |
| 3,383,563 | 5/1968 | Wright | 320/61 |
| 3,497,791 | 2/1970 | Moore | 320/39 |

*Primary Examiner*—D. F. Duggan
*Assistant Examiner*—Ulysses Weldon
*Attorney*—Holman & Stern ABSTRACT: A battery-charging system for a road vehicle includes a permanent magnet alternator which charges the vehicle battery to a rectifier with which is associated one or more negative gated thyristors for controlling the output of the alternator.

PATENTED JUN 22 1971 3,586,956

INVENTOR
Michael Murray Bertioli & Malcolm Williams
BY Holman, Glascock,
Downing & Seebold
ATTORNEYS

BATTERY-CHARGING SYSTEMS FOR ROAD VEHICLES

This invention relates to battery-charging systems for road vehicles.

The invention makes use of a semiconductor switch having an anode, a cathode and a gate, this switch having the characteristic that it can be turned on by a negative pulse between its gate and cathode, and then remains on until the anode-cathode current falls to zero. Thus, the device is similar to the thyristor, except of course that a thyristor requires a positive gate-cathode bias to turn it on. A device which can be turned on by a negative gate-cathode pulse in this way is referred to throughout the specification as a negative gated semiconductor switch.

The invention resides in a battery-charging system for a road vehicle including a permanent magnet alternator serving to charge a vehicle battery through a negative gated semiconductor switch, means being provided for removing the gating current from said switch when the battery voltage exceeds a predetermined value.

In a battery-charging system using a thyristor through which a battery is charged by a permanent magnet alternator, the cathode of the thyristor is of course connected to the positive battery terminal, and so in order to turn the thyristor on the gate must be made more positive than the positive battery terminal. For this reason, a transformer or some other form of reactive component must be employed, so increasing the expense of the regulator circuit. Using a negative gated semiconductor switch avoids these difficulties.

Figure 1:
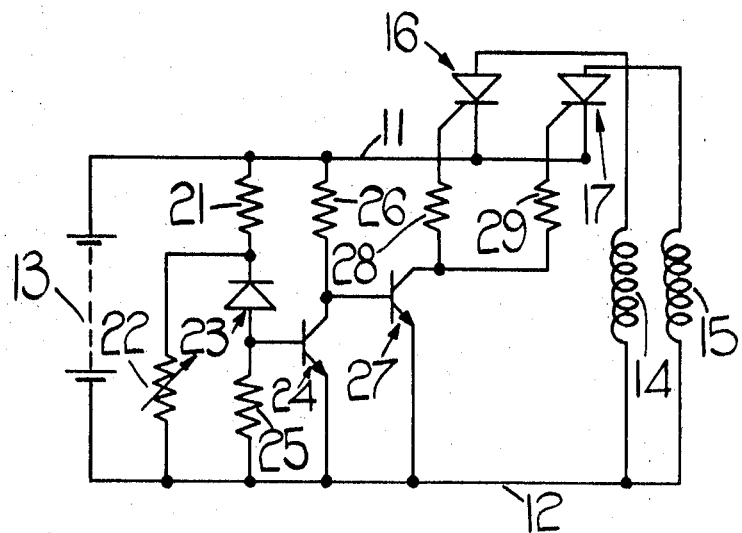
FIG. 1 is a circuit diagram illustrating one example of the invention.

Referring to FIG. 1, a battery-charging system in a road vehicle includes positive and negative supply lines 11, 12 between which the battery 13 of the vehicle is connected. The battery is charged by a permanent magnet alternator having a pair of single phase windings 14, 15 each having one end connected to the line 12, the other ends of the windings 14, 15 being connected to the line 11 through the anode-cathode paths of a pair of negative gated semiconductor switches 16, 17 respectively.

Connected between the lines 11, 12 in series are a resistor 21 and a variable resistor 22, the junction between the resistors 21, 22 being connected through a Zener diode 23 to the base of an NPN transistor 24, the base of which is also connected to the line 12 through a resistor 25 and the emitter of which connected to the line 12. The collector of the transistor 24 is connected to the line 11 through a resistor 26, and is further connected to the base of an NPN transistor 27, the emitter of which is connected to the line 12, and the collector of which is connected to the gates of the switches 16, 17 through a pair of resistors 28, 29 respectively.

In operation, assuming that the voltage of the battery 13 is below a predetermined value, then the Zener diode 23 is non-conductive and current flows through the resistor 26 to turn the transistor 27 on, so that negative current flows from the line 12 through the emitter and collector of the transistor 27, and thence through the resistor 28 and the gate-cathode path of the switch and also through the resistor 29 and the gate-cathode path of the switch 17, so that the switches 16 and 17 both conduct whenever they are forward biased by their windings 14, 15. As the voltage of the battery rises, a point is reached at which the Zener diode 23 conducts, so turning on the transistor 24 and removing the base current from the transistor 27. The gate current is now removed from the switches 16 and 17, which turn off as soon as they are reverse biased by their windings 14, 15.

Figure 2:
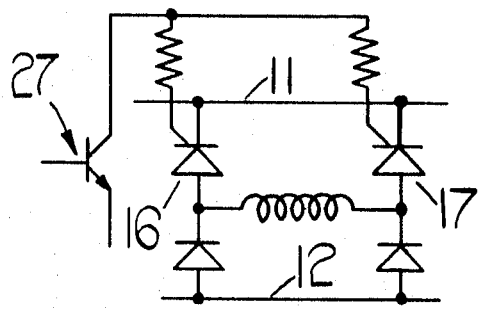
FIGS. 2 and 3 show modifications of FIG. 1.
Figure 3:
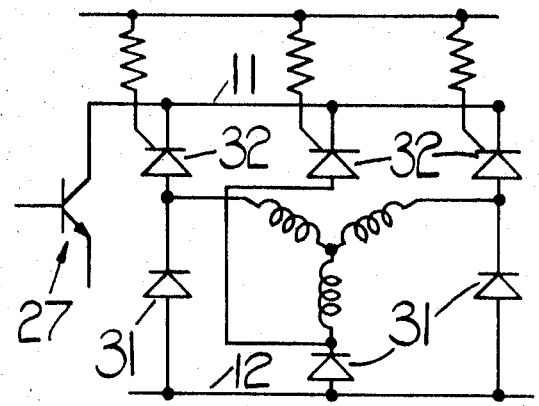

The example shown can be applied with minor modifications to other forms of permanent magnet alternators. For example, as shown in FIG. 2, in a single phase alternator the supply to the lines 11, 12 can be fed through a full wave rectifier with two of its diodes replaced by switches 16, 17. Similarly, as shown in FIG. 3, in a three-phase arrangement a full wave rectifier with three diodes 31 and three switches 32 can be used.

Having thus described our invention what we claim as new and desire to secure by Letters Patent is:

1. A battery-charging system for a road vehicle, including a permanent magnet alternator, a vehicle battery, a negative gated semiconductor switch, said switch serving to conduct when it is provided with gating current, means coupling said alternator to said battery through said negative gated semiconductor switch whereby said alternator charges said battery when said negative gated semiconductor switch is conductive, and means connected across said battery and sensitive to the voltage of said battery for removing the gating current from said switch when the battery voltage exceeds a predetermined value.